Aug. 31, 1943.                M. D. McCARTY                2,328,222
                                  GEOPHONE
                             Filed Oct. 1, 1941
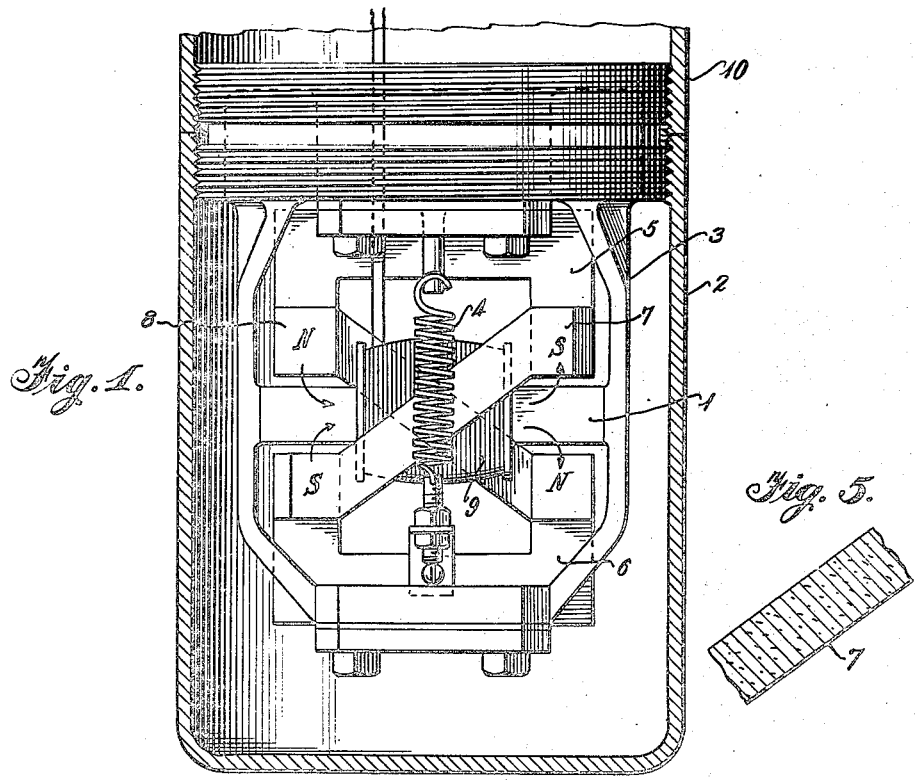
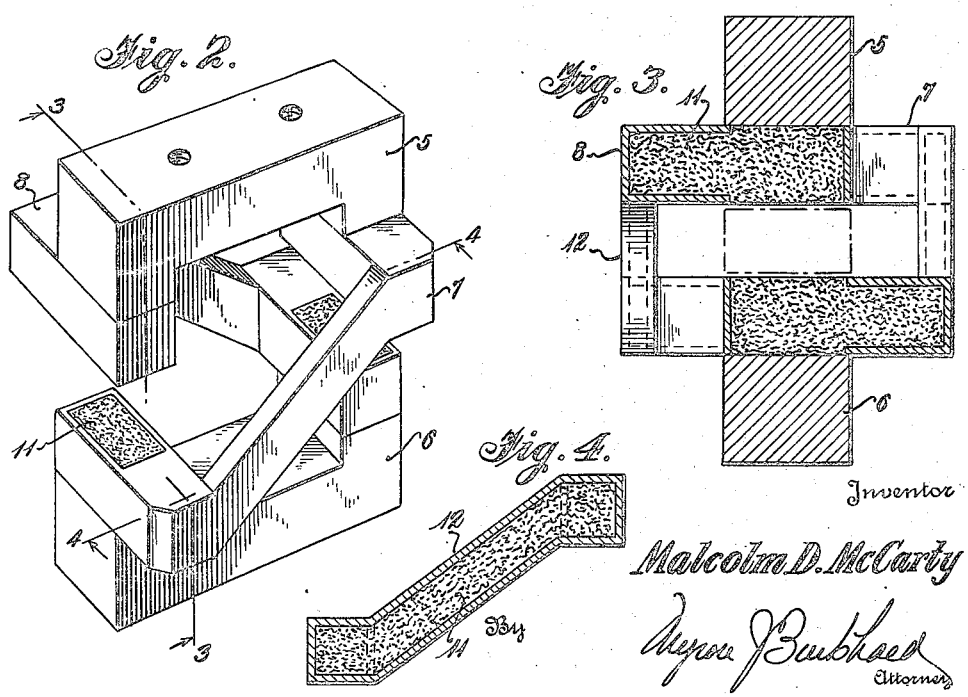
Inventor
Malcolm D. McCarty Patented Aug. 31, 1943

2,328,222

UNITED STATES PATENT OFFICE 2,328,222

GEOPHONE

Malcolm D. McCarty, Dallas, Tex., assignor to Socony-Vacuum Oil Company, Incorporated, New York, N. Y., a corporation of New York Application October 1, 1941, Serial No. 413,117

9 Claims. (Cl. 177—352)

This invention relates generally to improvements in seismographic apparatus, and more particularly to that portion of the apparatus commonly known in the art as geophones, detectors, or seismometers.

In a geophone, permanent magnets are employed to establish the operating magnetic field of the instrument. A soft iron armature is mounted between the poles of the permanent magnets in the magnetic field of the instrument. A coil surrounds the armature, and the coil is provided with leads extending out of the geophone, through which leads electrical impulses generated in the coil can be transmitted to a recording galvanometer for the purpose of recording a seismogram. The armature and the permanent magnets are so mounted as to permit of relative movement when the geophone, which is placed in the ground, is vibrated by arriving seismic waves, such as seismic waves which are generated by the detonation of a charge of explosives in the usual methods of seismic survey. This relative movement of armature and permanent magnets, caused by the arrival of seismic waves at the geophone, changes the air gap between the armature and the magnets, thereby changing the reluctance of the magnetic circuits in the instrument, effecting a corresponding change in magnetic flux flowing through the armature, and generating voltages in the coil surrounding the armature which correspond to the seismic waves and can be utilized in recording a seismogram.

A principal problem confronting design engineers in the development of geophones to date, however, has been the development of a geophone having high sensitivity. Due to the fact that it is necessary to employ permanent magnets, the reluctance of the magnetic circuit has heretofore of necessity been very high, and since the reluctance of permanent magnet material is extremely high compared to soft iron, it limits the maximum sensitivity obtainable from a geophone having hard or permanent magnetic material incorporated in their design. The reluctance of the magnetic circuit in the geophone is so high that the change in total reluctance, due to changes in the air gaps occasioned by arrival of seismic waves, is relatively small, with the result that only relatively small changes in flux through the armature will be effected and correspondingly small voltages generated in the coil. This gives a geophone of relatively low sensitivity.

Soft magnetic materials can be utilized to secure low reluctance paths. With paths of low reluctance, one is able to obtain relatively large flux densities. In the case of soft magnetic materials where $F$ is the magnetomotive force in Gilberts, $\phi$ the total flux in Maxwells, and $R$ the reluctance in Oersteds, of a closed iron circuit, then $\phi$ equals $F/R$, similar to Ohm's law for the electrical circuit. The reluctance of a piece of iron is $R$ equal to $L/\mu A$ where $L$ is the length in centimeters, $A$ is the cross-section in square centimeters and $\mu$ the permeability. Therefore, the greater the permeability, the less the magnetic reluctance. Soft magnetic materials include the following metals known by their trade names as "Silicon Steel," "Permalloy," "Nikalloy," "Hypernic," "Electric Metal," etc.

The use of these materials, however, in the design of geophones heretofore has been impracticable, for in all soft magnetic materials, when the magnetizing force is removed, the flux decreases at once to practically zero, thus making it impossible to provide the necessary permanent magnetic field for the instrument. If one determines the hysteresis loop of soft iron materials, the loop should be as small as possible to indicate good magnetic results. Additionally, the full value of the magnetization should be reached for small values of magnetizing force. Such conditions enable one to secure high permeabilities, which are obtained at minute magnetizing forces for soft metals such as "Permalloy." Smaller values are obtained at comparable magnetizing forces in other soft magnetic materials, but at high flux densities and high magnetizing forces, the permeabilities all drop off and approach one another in magnitude. In using soft magnetic materials, it is essential therefore, to operate the iron at a flux density corresponding roughly to maximum permeability. This region corresponds roughly to 5000 gausses (Maxwells per square centimeter) where permeabilities of from one thousand up to several thousand may be obtained.

In contrast, let us consider the properties or characteristics of permanent or hard magnetic materials. Permanent magnetic materials possess just the opposite properties of those characterizing soft magnetic materials. The permanent magnets are made from very hard material, in which the molecules can be oriented only with great difficulty, and as a result the residual magnetism ($B_R$) is high, the coercive force ($H_C$) (magnetomotive force necessary to reduce the residual flux to zero) is very high, the permeability is low, and the hysteresis loop is of large area.

It is thus evident that it is a poor magnetic circuit design which makes it necessary, as is the case in current geophone design, to utilize the permanent magnet as part of a magnetic circuit which should have a reluctance as low as it is possible to obtain, consistent with economy, materials, and space. This is particularly true in geophones where small alternating magnetic fluxes are required for their operation.

The present invention provides a geophone of simple design and construction which comprises permanent magnets large enough to supply sufficient flux in the air gaps for efficient operation and, in addition provides a path of low reluctance for the alternating flux. The path provided in accordance with this invention for the alternating flux is of total reluctance sufficiently low that the magnetomotive forces, generated by arrival of seismic waves which it is desired to record, effect substantial changes in the flux through the low reluctance circuit and armature and generate correspondingly large voltage impulses in the coil. The result is a geophone of high sensitivity.

Therefore, the primary object of this invention is the provision of a geophone utilizing permanent magnets of hard magnetic material to supply the steady flux, and having a special soft iron path of low reluctance for the alternating flux, which instrument will operate at a relatively high sensitivity, due to the low reluctance of the alternating flux circuit.

Another object of this invention resides in the provision of low reluctance connecting links that are formed by inclosing filings from materials such as those known by their trade-names "Permalloy," "Hypernic," "Electric Metal," etc., in plastic envelopes. This invention is illustrated by the attached drawing in which:

Figure 1 is a vertical elevation partly in section, showing the application of the low reluctance links to a geophone to form the alternating flux circuit;

Figure 2 is a perspective view of the elements forming the magnetic circuit in the geophone;

Figure 3 is a cross-sectional view of the magnetic assembly taken along the lines 3—3 in Figure 2;

Figure 4 is a cross-sectional view of one of the low reluctance links taken along the line 4—4 of Figure 2; and Figure 5 is a cross-sectional view of a fragment of one of the links showing a modified form of the present invention.

Referring to the drawing in detail, particularly Figure 1, there is shown an armature 1 which may or may not be of laminated construction, connected to and adapted to be moved by the geophone case or shell 2, through means of the frame member 3, which is secured in any suitable manner rigidly to the top portion of shell 2. Resiliently mounted with respect to the frame 3, and retained in balanced position by the weight compensating spring 4, are the magnetic materials 5, 6, 7 and 8 which, due to their resilient mounting function as inertia weights. This assembly of magnetic materials comprises the substantially U-shaped permanent magnets 5 and 6 that are positioned above and below the armature 1. These members are so disposed in their assembled relationship that the member of the U-shaped magnet of north polarity is directly opposite the south pole of the other magnet, which lies on the opposite side of the armature 1. The permanent magnets 5 and 6 are of hard magnetic material, such for example, as 35% cobalt steel or a metal sold on the market under the trade-name of "Alnico Metal." Although these magnets are of high magnetization, they present an extremely high reluctance to the flow of small alternating fluxes, which would be generated by the geophone in operation. In accordance with this invention, separate paths are provided for the alternating fluxes and are formed by the elements 7 and 8 of soft magnetic material having a high permeability. These pieces of high permeability material are so arranged in the assembly (see Figure 1) that the respective ends of each element 7 and 8 form pole tips for the like poles of each of the permanent magnets, and are disposed between the pole tip of the permanent magnet and the armature 1.

Elements 7 and 8 have heretofore been of laminated construction. Due to the peculiar shape of the links 7 and 8 it has been necessary to completely manufacture them by hand. This has made the cost of production of such a geophone run extremely high. The instant invention has overcome these objectionable construction features by forming these connecting links 7 and 8 of low reluctance filings from some metal such as that known on the market as "Permalloy." Referring to Figures 2, 3 and 4, the filings 11 are closely packed in an envelope 12 formed from a plastic material. The links 7 and 8 can be formed by first molding the envelope 12 from plastic material and then packing or pressing the filings 11 in the envelope. As shown in Figures 2 and 3, a portion of the plastic envelopes, adjacent the poles of the permanent magnets 5 and 6 and armature 1, is cut away so that the filings will contact the pole faces of the permanent magnet and the air gap between the connecting links and the armature can be reduced to a minimum. The exposed filings forming a pole face adjacent the armature are cemented or fused together to hold them in the envelope.

Although these connecting links have been disclosed in the form of filings enclosed in a plastic envelope, it is obvious to those skilled in the art that the filings could also be first imbedded in the plastic material and then molded to form. This form of the invention is illustrated in Figure 5 of the drawing. It is believed, however, that by first mixing the filings with the plastic material and then molding the links, that links would be produced having a higher reluctance than those formed by the first disclosed method.

With reference to Figure 1, it can be seen that if the armature 1 is caused to move vertically, that is, to oscillate in the air gap provided by the arrangement of magnets described above, there will be only a slight change in the direct flux flowing in the upper and lower permanent magnetic circuits (which depend upon the armature to form a portion of each circuit), because change in air gap will not effect a substantial change in the total reluctance of this high reluctance circuit. However, a substantial change in flux will occur in the low reluctance circuits comprising the connecting elements 7 and 8 and the armature 1. This varying flux generated by osillation of the armature relative to the permanent magnets will not flow through the high reluctance circuit that is made up partly of the permanent magnetic material, but will flow though the armature when it is moved in one direction and across the air gap say to the south pole tip of magnet 5, around through the path provided by the high permeability material 7, enclosed in the plastic envelope 12, and back into the armature at its opposite end. Due to the fact that the permeability of the path thus provided for the alternating flux is so much higher than that of the permanent magnetic material, a greater amount of useful alternating flux is generated. By placing a coil 9 around the moving armature 1, as shown, and bringing the leads from this coil up and out through the top portion of the cap 10, voltages generated in this coil by the flow of magnetic fluxes through the armature can, after suitable amplification, be recorded on a galvanometer. Due to the reversal of flux in the armature caused by its oscillation, these voltages will be alternating current voltages.

To better illustrate the path of alternating fluxes, when the armature 1 is caused to oscillate in the air gap, assuming that the armature is moving toward its maximum up position, the instantaneous path of the generated alternating fluxes would be as indicated by the arrows in Figure 1, the heavy arrows indicating the strongest flow of flux and the light arrows the weakest flow of flux. On movement of the armature to its maximum bottom position, the values of the alternating fluxes will be reversed.

Due to the fact that the changes in the air gaps between the poles of the magnets and the armature are extremely small, ranging in the neighborhood of .001 inch, there is very little change in reluctance of the high reluctance permanent magnet circuit when the armature is caused to oscillate in sympathy with seismic waves, which act upon the geophone through the medium of its case or shell 2, which is in contact with the earth. For this reason, the change in direct flux, in both the upper and lower permanent magnet circuits, is relatively small.

In the balanced type geophone, as contemplated by this invention, the fluxes, when no movement of the armature is taking place, are balanced, and this balance is maintained until the armature is caused to move out of its neutral position with respect to the magnetic pole. During the oscillation of the armature, when it approaches a pair of pole faces, the flux through that half of the circuit is increased, while that through the opposite portion of the circuit is decreased. This gives what is termed a push-pull effect. Using the balanced type of geophone, the alternating fluxes are generated on the most effective portion of the hysteresis loop where a relatively small magnetomotive force will produce the greatest flux values. In design and from actual tests made in the laboratory, it has been found that the reluctance of the air gaps between the armature and the pole faces is in many instances much lower than that of the magnetic circuit formed by the permanent magnetic material.

It is to overcome this undesirable effect that the balanced armature type of construction with low reluctance alternating flux paths was devised. A further benefit of this construction is that greater electromagnetic damping of the geophone is obtained for the reason that greater electrical efficiency is secured with this construction. That is, greater currents will flow in the geophone and in the input amplifier circuits, and also greater alternating fluxes will be present with this construction than with the usual type of construction. These greater alternating currents and fluxes in the geophones will result in greater electromagnetic damping of the inner oscillatory system, whose free oscillations are to be avoided as much as possible.

I claim:

1. In an instrument adapted to detect seismic waves by generating electrical signals corresponding to them, of the type which utilizes alternating flux paths that are distinct from the source of direct flux, the improvement which comprises low reluctance conductors for the alternating flux, each of said low reluctance conductors comprising a plastic envelope and high permeability metal filings within the envelope, whereby the filings in the envelope with the armature form a high permeability path for the alternating flux.

2. In an instrument adapted to detect seismic waves by generating electrical signals corresponding to them of the type which utilizes alternating flux paths that are distinct from the source of direct flux, the improvement which comprises low reluctance conductors for the alternating flux, each of said low reluctance conductors comprising links connecting like poles of permanent magnets formed by molding metal filings with a binder into the desired shape, whereby the filings with the armature form a high permeability path for the alternating flux.

3. In an instrument adapted to detect seismic waves by generating electrical signals corresponding to them of the type which utilizes alternating flux paths that are distinct from the source of direct flux, the improvement which comprises low reluctance conductors for the alternating flux, each of said low reluctance conductors comprising links connecting like poles of permanent magnets formed by molding metal filings with a plastic binder into the desired shape, whereby the filing with the armature form a high permeability path for the alternating flux.

4. A geophone adapted for use in detecting seismic waves by generating electrical signals corresponding to them, comprising in combination a casing, a frame secured within and adapted to be carried by the casing, a substantially bar-shaped armature carried by said frame and adapted for movement therewith, a coil on said armature having its leads extending to a point outside of the casing for electrical connections, an inertia assembly, and means for resiliently mounting the inertia assembly on the frame inside the casing in operative relationship with the armature, said inertia assembly comprising a pair of permanent magnets disposed relative to the armature in such a manner that a north and south pole will lie on opposite sides of each end of the armature, and high permeability links connecting like poles of the two magnets and forming between the poles of the magnets and the armature, high permeability pole faces for the magnets, each of said connecting links comprising an envelope, and high permeability metal filings within the envelope, whereby the filings in the connecting links with the armature form a high permeability path for the alternating flux.

5. A geophone adapted for use in detecting seismic waves by generating electrical signals corresponding to them, comprising in combination a casing, a frame secured within and adapted to be carried by the casing, a substantially bar-shaped armature carried by said frame and adapted for movement therewith, a coil on said armature having its leads extending to a point outside of the casing for electrical connections, an inertia assembly, and means for resiliently mounting the inertia assembly on the frame inside the casing in operative relationship with the armature, said inertia assembly comprising a pair of permanent magnets disposed relative to the armature in such a manner that a north and south pole will lie on opposite sides of each end of the armature, and high permeability links connecting like poles of the two magnets and forming between the poles of the magnets and the armature, high permeability pole faces for the magnets, each of said connecting links comprising a plastic envelope, and high permeability metal filings within the envelope, whereby the filings in the connecting links with the armature form a high permeability path for the alternating flux.

6. A geophone adapted for use in detecting seismic waves by generating electrical signals corresponding to them, comprising in combination a casing, a frame secured within and adapted to be carried by the casing, a substantially bar-shaped armature carried by said frame and adapted for movement therewith, a coil on said armature having its leads extending to a point outside of the casing for electrical connections, an inertia assembly, and means for resiliently mounting the inertia assembly on the frame inside the casing in operative relationship with the armature, said inertia assembly comprising a pair of permanent magnets disposed relative to the armature in such a manner that a north and south pole will lie on opposite sides of each end of the armature, and high permeability links connecting like poles of the two magnets and forming between the poles of the magnets and the armature, high permeability pole faces for the magnets, each of said connecting links comprising an envelope, and high permeability metal filings within the envelope, said envelope having portions cut away on opposite sides of each end to effect a direct connection between the metal filings and the permanent magnets and to reduce the length of air gap between the filings and the armature, whereby the filings in the connecting links with the armature form a high permeability path for the alternating flux.

7. A geophone adapted for use in detecting seismic waves by generating electrical signals corresponding to them, comprising in combination a casing, a frame secured within and adapted to be carried by the casing, a substantially bar-shaped armature carried by said frame and adapted for movement therewith, a coil on said armature having its leads extending to a point outside of the casing for electrical connections, an inertia assembly, and means for resiliently mounting the inertia assembly on the frame inside the casing in operative relationship with the armature, said inertia assembly comprising a pair of permanent magnets disposed relative to the armature in such a manner that a north and south pole will lie on opposite sides of each end of the armature, and high permeability links connecting like poles of the two magnets and forming between the poles of the magnets and the armature, high permeability pole faces for the magnets, each of said connecting links comprising a plastic envelope, and high permeability metal filings within the envelope, said envelope having portions cut away on opposite sides of each and to effect a direct connection between the metal filings and the permanent magnets and to reduce the length of air gap between the filings and the armature, whereby the filings in the connecting links with the armature form a high permeability path for the alternating flux.

8. A geophone adapted for use in detecting seismic waves by generating electrical signals corresponding to them, comprising in combination a casing, a frame secured within and adapted to be carried by the casing, a substantially bar-shaped armature carried by said frame and adapted for movement therewith, a coil on said armature having its leads extending to a point outside of the casing for electrical connections, an inertia assembly, and means for resiliently mounting the inertia assembly on the frame inside the casing in operative relationship with the armature, said inertia assembly comprising a pair of permanent magnets disposed relative to the armature in such a manner that a north and south pole will lie on opposite sides of each end of the armature, and high permeability links connecting like poles of the two magnets and forming between the poles of the magnets and the armature, high permeability pole faces for the magnets, each of said connecting links comprising high permeability metal filings molded into form with a plastic material, whereby the filings in the connecting links with the armature form a high permebiilty path for the alternating flux.

9. In an instrument adapted to detect seismic waves by generating electrical signals corresponding to them of the type which utilizes alternating flux paths that are distinct from the source of direct flux, the improvement which comprises low reluctance conductors comprising links connecting like poles of permanent magnets for producing direct flux, said links consisting of high permeability metal filings and a plastic material surrounding said filings and bonding them together into the desired shape.

MALCOLM D. McCARTY.